C. ANDERSEN.
Filters.

No. 151,339. Patented May 26, 1874.

Witnesses:

Inventor:
Christian Andersen

UNITED STATES PATENT OFFICE.

CHRISTIAN ANDERSEN, OF BROOKLYN, NEW YORK.

IMPROVEMENT IN FILTERS.

Specification forming part of Letters Patent No. 151,339, dated May 26, 1874; application filed May 14, 1874.

*To all whom it may concern:*

Figure 1:
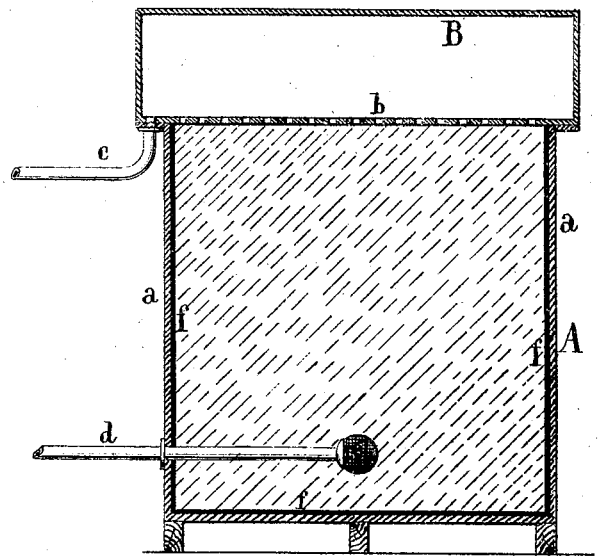
Figure 2:
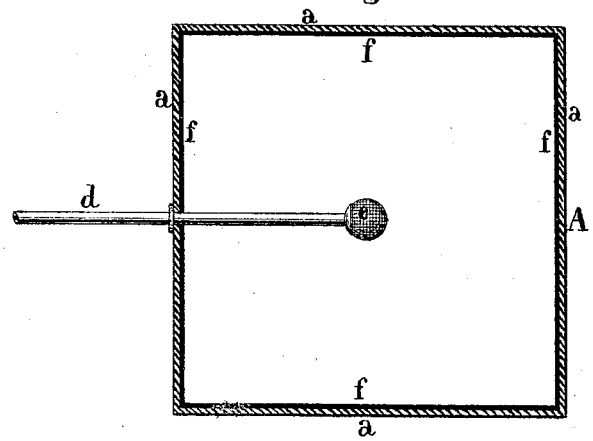

Be it known that I, CHRISTIAN ANDERSEN, of Brooklyn, in the county of Kings and State of New York, have invented certain new and useful Improvements in Filters, of which the following is a specification:

This invention is illustrated in the accompanying drawing, in which Figure 1 represents a vertical section of this invention. Fig. 2 is a horizontal section of the same.

Similar letters indicate corresponding parts.

This invention consists in the arrangement of a lining of cloth, felt, or other absorbent material on the solid sides of a filtering-vessel, which is filled with bone-black or other filtering material, and the top or bottom, or both of which are perforated, while the liquid to be filtered is introduced through a pipe with a rose-head, in such a manner that by the absorbent lining the formation of channels through the filtering material close to the sides of the filtering-vessel is prevented, and the liquid to be filtered is brought in intimate contact with the filtering material.

In the drawing, the letter A designates a vessel made of sheet metal or any other suitable material, in any desirable form or shape. The sides $a\ a$ of this vessel are solid, but its head $b$ (or its bottom) is perforated, and over this perforated head is placed a cap, B, so that the liquid to be filtered passes through the perforations in the head $b$ into the space under the cap B, whence it discharges through the pipe $c$. The liquid is admitted to the filtering-vessel through a pipe, $d$, which terminates in a rose-head, $e$, situated in the interior of the vessel A, and the solid sides of this vessel are lined on their inner surfaces with layers $f$ of cloth, felt, or other absorbent material.

The vessel A is packed with bone-black or other filtering material, and if the sides of said vessel are not lined with an absorbent material the liquid to be filtered, on being admitted to the vessel A, forms channels through the filtering material close to the sides of said vessel, and a large percentage of the liquid escapes from the filtering-vessel without having come in contact with the filtering material, and consequently without having been deprived of the impurities mixed with it. This disadvantage I have successfully obviated by lining the sides of the filtering-vessel with an absorbent material, and my experience shows that by the application of such lining the formation of channels through the filtering material is successfully avoided, and the liquid to be filtered is prevented from passing through the filtering material in the vessel A without coming in intimate contact with the same, so that said liquid, as it discharges from the filtering-vessel, is deprived of the impurities which had been mixed with it.

What I claim as new, and desire to secure by Letters Patent, is—

The arrangement of a lining, $f$, of cloth, felt, or other absorbent material on the solid sides of a filtering-vessel, A, which is provided with perforations in its head or bottom, or in both, and to which the liquid to be filtered is admitted through a pipe, $d$, substantially as shown and described.

In testimony that I claim the foregoing I have hereunto set my hand and seal.

C. ANDERSEN. [L. S.]

Witnesses:
W. HAUFF,
E. F. KASTENHUBER.